Mar. 27, 1923.

C. H. FULSON 1,450,030

CAKE FORMER

Filed July 14, 1921

Inventor
C. H. Fulson
By his Attorneys
Pennie Davis Marvin Edmonds

Patented Mar. 27, 1923.

1,450,030

UNITED STATES PATENT OFFICE.

CHARLES HIRAM FULSON, OF TRENTON, TENNESSEE, ASSIGNOR TO THE AMERICAN COTTON OIL COMPANY, OF NEW YORK, N. Y., A CORPORATION OF NEW JERSEY.

CAKE FORMER.

Application filed July 14, 1921. Serial No. 484,596.

*To all whom it may concern:*

Be it known that I, CHARLES H. FULSON, a citizen of the United States, residing at Trenton, in the county of Gibson, State of Tennessee, have invented certain new and useful Improvements in Cake Formers; and I do hereby declare the following to be a full, clear, and exact description of the invention, such as will enable others skilled in the art to which it appertains to make and use the same.

My invention is an improvement in cotton seed cake formers, and relates especially to a new and improved mechanism for insuring an even distribution of the meats in the former, whereby to produce a cake of uniform size, and of substantially equal thickness throughout. In the usual practice of forming pressed and cooked cotton seed into cakes, the cooked meats are fed to a former by a reciprocating charger, moving between the cooker and the former box, and delivering the meats thereto. The charger is reciprocated by fluid pressure controlled means, as for instance steam, and as a rule it travels at a high speed, the flow of the motive fluid to the moving means being controlled automatically. When the consequence in a well formed cake of uniform thickness.

Figure 1:
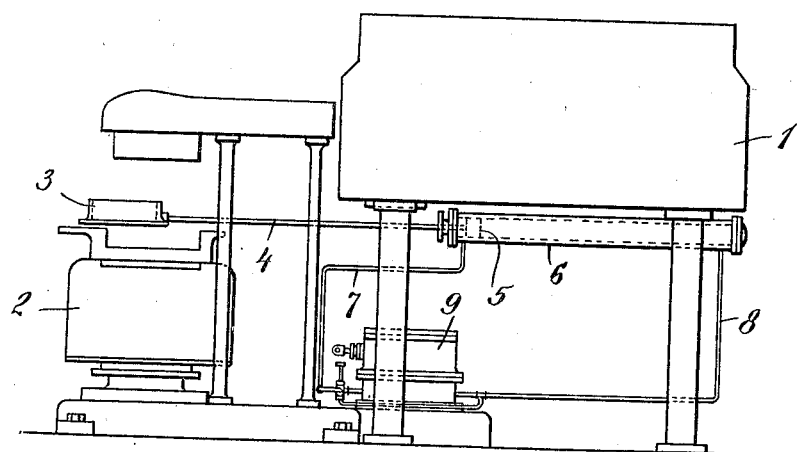
Figure 1 is a front view of a portion of a cake forming machine.
Figure 3:
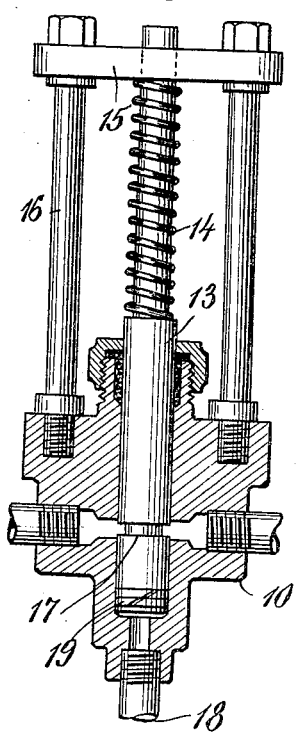
Figure 3 is a vertical section through the auxiliary valve.
Figure 2:
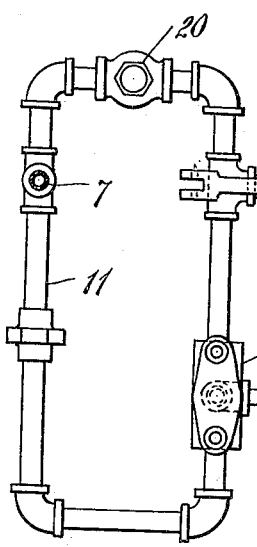
Figure 2 is a plan view of the controlling mechanism for the fluid pressure.

The present embodiment of the invention is shown in connection with a cake forming mechanism, comprising the usual cooker 1, the former 2 and the charger 3. The charger which moves between the cooker and the former is connected to one end of a piston rod 4, whose other end is connected with a piston 5 in a cylinder 6 arranged adjacent to the cooker. The cylinder is supplied with motive fluid, as for instance steam, or other fluid under pressure, by means of pipes 7 and 8, the said pipes connecting with the opposite ends of the cylinder. The flow of fluid to and from the pipes 7 and 8, is automatically controlled by means of a valve indicated generally at 9, and this valve is automatically operated to reverse the direction of flow at the end of the movement in each direction of the 10 is also interposed in this side member of the system. This valve comprises the casing 10, within which is movable a valve 13, and the valve is normally pressed downward by a spring 14 which encircles the stem of the valve between an annular shoulder on the stem, and a stop plate 15, supported by rods or standards 16 extending upwardly from the casing. The valve 13 has an annular port or passage 17, which when the valve is in its lowermost position opens the communication through the system 11. When the valve is moved upward, the passage is out of register with the system, and the circulation through the system is checked. A branch pipe 18 connects the underside of the casing 10 with the pipe 8, between the valve 9 and the cylinder 6, the arrangement being such that when the valve 9 is operated to admit the motive fluid to the end of the cylinder 6 remote from the charger, such fluid pressure will also be admitted beneath the valve 13, to lift said valve. The lower end of the valve 13 is provided with piston rings as shown at 19 in Figure 3, to prevent escape of motive fluid from the pipe 18 to the system of piping 11. A check valve 20 is interposed in the end member of the system of piping 11, between the pipe 7 and the valve 9. This valve permits the free flow of the fluid from the pipe 7, but prevents the passage of the fluid to the said pipe, constraining the fluid to pass by way of the valve 10.

The operation of the improvement is as follows:—

When the valve 9 is operated to admit motive fluid to the pipe 8, the piston 5 is moved outward carrying with it the charger, supporting a charge of cooked meats. When the piston reaches the end of its outward stroke, the valve 9 is automatically operated to reverse the flow of the motive fluid. Normally the fluid would now pass from the valve 9 through the piping 11 and the pipe 7 to that end of the cylinder 6 adjacent to the charger, and the charger would begin at once its reverse movement, and the meats carried by the charger would be thrown inward toward the inner side of the former box. The check valve 20 however, constrains the fluid to flow by way of the auxiliary valve 10. This valve is lifted as soon as the motive fluid is admitted to the pipe 8, the pressure being transmitted through the branch 18 to the underside of the valve. The valve is raised, and communication through the system 11 from the valve 9 to the pipe 7 is cut off. When the flow of fluid is reversed, that is when the fluid is cut off from the pipe 8 and admitted to the piping 11, the valve is still lifted, so that the fluid is cut off from the pipe 7. The spring 14 however, comes at once into operation, and depresses the valve, opening the communication between the valve 9 and the pipe 7, so that the charger is moved inwardly. The slight delay however permits the charger to empty and the meats are evenly distributed in the former box, so that a cake of uniform dimenisons results when pressure is applied. The amount of delay may be varied within limits, by adjusting the tension of the spring 14. The valve begins to open with the beginning of the fall of pressure in the line 8, and by tensioning the spring, the opening of the valve may be hastened or delayed as may be desired.

I claim:

1. In a machine of the class described, the combination with the former, the charger, and the fluid pressure controlled means for reciprocating the charger, of means controlled by the flow of fluid to move the charger in one direction for delaying the commencement of the movement in the opposite direction.

2. In a machine of the class described, the combination with the former, the charger, and the fluid pressure controlled means for reciprocating the charger, of means controlled by the flow of fluid to move the charger outwardly for delaying the commencement of the inward movement of the charger.

3. In a machine of the class described, the combination with the former, the charger, and the fluid pressure controlled means for reciprocating the charger, of means controlled by the flow of fluid to move the charger in one direction for delaying the commencement of the movement in the opposite direction, said means comprising a normally open valve moved to closed position by the fluid pressure passing to the moving means.

4. In a machine of the class described, the combination with the former, the charger, and the fluid pressure controlled means for reciprocating the charger, of means controlled by the flow of fluid to move the charger in one direction for delaying the commencement of the movement in the opposite direction, said means comprising a valve, a spring normally holding the valve open, said valve being interposed in the fluid pressure supply line and moved to closed position by the flow of the fluid to move the charger in the first named direction.

5. In a machine of the class described, fluid pressure controlled mechanism for reciprocating the charger, means for controlling the flow of fluid to said mechanism, and means controlled by the flow of fluid to move the charger in one direction for delaying the flow of fluid to move the charger in the other direction.

6. In a machine of the class described, the combination with the charger, and the fluid pressure controlled means for reciprocating the charger, and the means for controlling the flow of fluid to said pressure controlled means, of auxiliary means controlled by the flow of fluids to move the charger in the one direction for delaying the movement of the charger in the other direction, and released by the fall of pressure in the first named end.

7. In a machine of the class described, fluid pressure controlled mechanism, comprising a cylinder, a piston in the cylinder for connection with the charger, and means for admitting fluid under pressure to the ends of the cylinder in alternation, of means controlled by the flow of fluid to one end of the cylinder for delaying the flow of fluid to the other end, and released by the fall of pressure in the first named end.

In testimony whereof I affix my signature.

CHARLES HIRAM FULSON.